P. R. KRAMER.
SAW MACHINE.
APPLICATION FILED MAR. 26, 1908.
927,551.
Patented July 13, 1909.
3 SHEETS—SHEET 3.
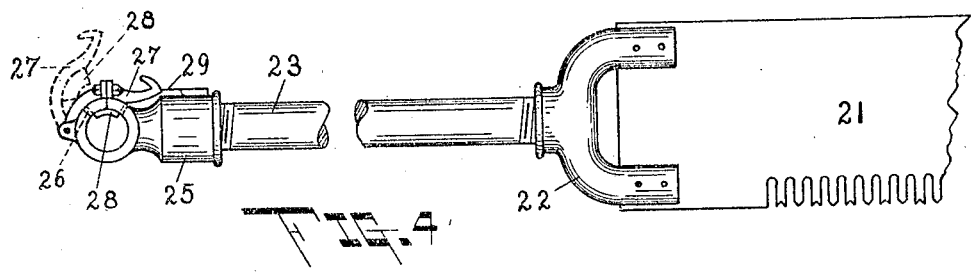
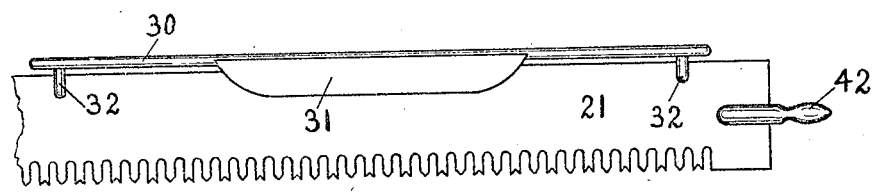
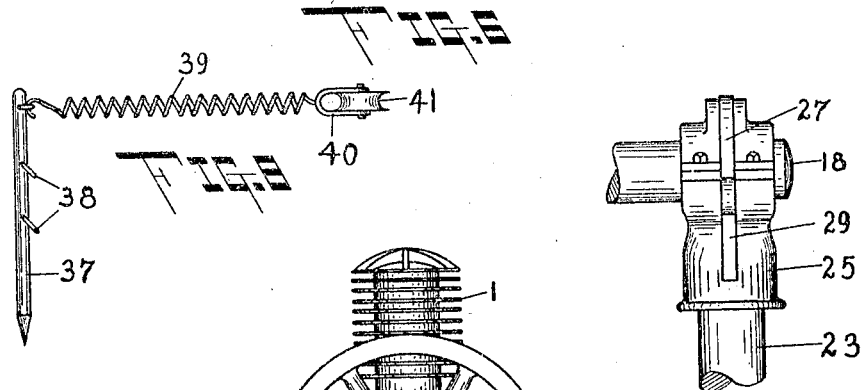
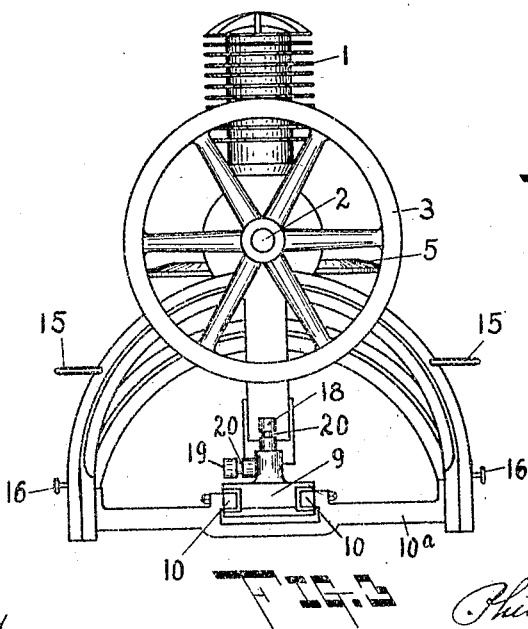
WITNESSES:
J. Ray Abbey
Ralph E. Warfield
INVENTOR
Phil R. Kramer
BY
Geo. B. Willcox
ATTORNEY

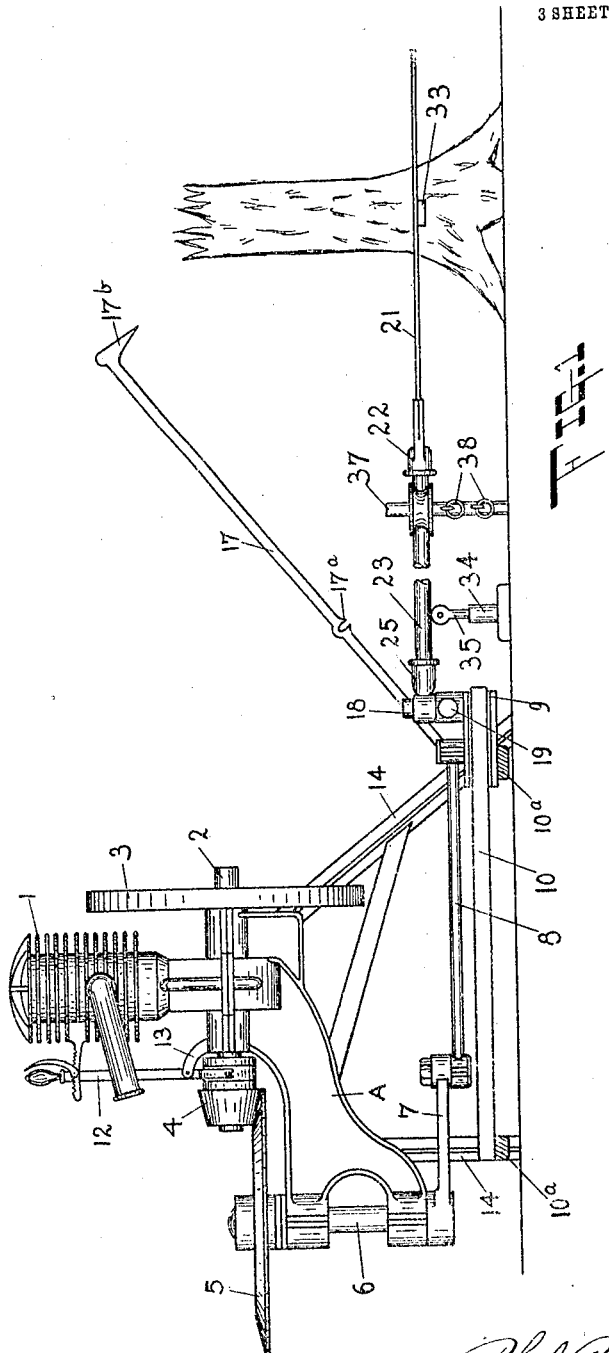

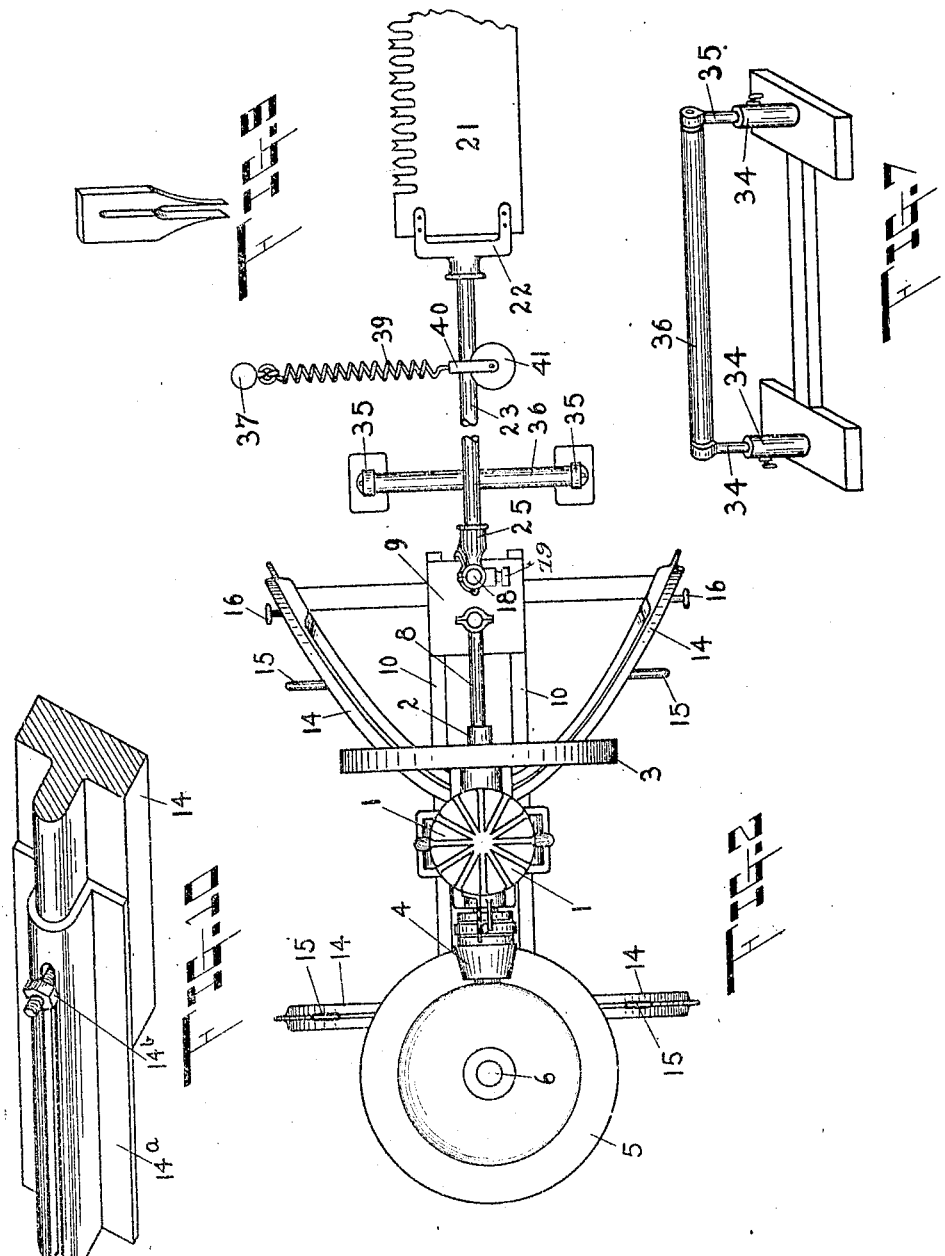

UNITED STATES PATENT OFFICE.

PHILIP R. KRAMER, OF BAY CITY, MICHIGAN, ASSIGNOR TO EDWARD C. EWEN, OF SAGINAW, MICHIGAN.

SAW-MACHINE.

No. 927,551.  Specification of Letters Patent.  Patented July 13, 1909.

Application filed March 26, 1908. Serial No. 423,483.

*To all whom it may concern:*

Be it known that I, PHILIP R. KRAMER, a citizen of the United States, residing at Bay City, in the county of Bay and State of Michigan, have invented certain new and useful Improvements in Saw-Machines; and I do hereby declare the following to be a full, clear, and exact description of the invention, such as will enable others skilled in the art to which it appertains to make and use the same.

My invention relates to sawing machines and more particularly to portable drag saw machines.

One object of my invention is to provide a machine which will cut down standing timber and stumps, the machine being capable of cutting the timber or stumps at the base right at the ground, or at some higher point if necessary or desired.

Another object is to provide a machine which will not only fell standing timber or stumps, but also cut up fallen timber into logs or shorter lengths for shingle or cooperage bolts, etc.

Still another object is to provide a simple, inexpensive machine of durable construction which will more speedily cut off a stump or fell a tree and cut it into logs and bolts than heretofore.

A further object is to provide a machine capable of easy transportation by the ordinary hand sawing crew of two men, and one which is inexpensive to operate and maintain in order.

A still further object is the provision of a machine wherein the power is transmitted to the saw gradually by a friction drive.

Heretofore toothed gears have been employed to transmit power, and being a positive drive, cause damage to both saw and machine in case the saw buckles or binds, whereas with my friction drive this danger is obviated by the friction slipping. Former machines were made too heavy for rapid transportation away from danger of destruction by falling trees, such as is sometimes necessary when felling trees, and too heavy for convenient moving from tree to tree or log to log. For these reasons, the former constructions are impractical and inefficient if not absolutely inoperative.

In my invention I provide a machine capable of easy and quick transportation so light that two men can carry the whole outfit, but sufficiently powerful to saw through the hardest tree, log, stump or timber, the machine being equipped with a motor running at high speed, the power being transmitted to the saw through a friction instead of a toothed gear.

Another object of my invention is the provision of means for preventing flexure of the saw when starting its cut.

A further object is the provision of means for automatically guiding and feeding the saw to the timber or stump.

A still further object is the provision of means supporting the saw intermediate the machine and the tree or log.

Still another object is the provision of means for controlling the speed of reciprocation of the saw.

Still another object is the provision of means for sawing horizontally and changing the saw to cut perpendicularly almost instantaneously without in any way changing the machine itself.

To these and other ends my invention consists in certain novel features and combinations of parts, such as will be more fully described hereinafter and particularly pointed out in the claims.

In the accompanying drawings, Figure 1 is a side view of one form of my invention; Fig. 2 is a top plan view; Fig. 3 is an end view of the motor and its support; Fig. 4 is a detail side view of the saw and saw bar showing the manner of its attachment to the connecting pins; Fig. 5 is a top plan view of the head carried by the saw bar; Fig. 6 is a detail side view of the means for preventing flexure of the saw; Fig. 7 is a detail perspective view of the rest; Fig. 8 is a detail side view of the saw-feeding means; Fig. 9 is a detail view of a fork; and Fig. 10 is a detail view of one means for connecting the extensions to the legs of the frame.

This invention is particularly designed for both felling standing timber and stumps and cutting fallen trees or logs into logs and bolts respectively, both acts being accomplished by instantly changing the saw bar on the head without disturbing the balance of the machine. The machine is equally applicable for sawing large or small timbers of every sort, whether in perpendicular or horizontal positions. To provide a practical machine of this nature, it is necessary to reduce the weight to enable it to be easily and quickly lifted and transported by hand.

In my invention I provide a vertically-located internal combustion engine and frame, the base of the engine being a part of the complete frame casting and adapted to transmit power through a friction gearing to a crank and link reciprocating in a horizontal plane. Means controlling the friction gearing is provided for regulating the speed of reciprocation of the crank and link. The link actuates a sliding cross-head by which the saw is driven.

In felling standing timber and stumps the saw is held horizontally and is fed in a horizontal plane through the tree. The machine is capable of cutting much closer to the ground than can be done manually and hence effects an immense saving in timber.

Referring to the drawings, (A) indicates any suitable frame on which is mounted a vertical internal combustion motor (1) of any approved type adapted to drive a horizontal shaft (2) journaled in the frame. The shaft is provided with a spoked fly-wheel (3) and a beveled friction pinion (4), the pinion engaging a beveled friction disk (5) secured to a vertically-extending counter-shaft (6) journaled in the frame. A horizontally-rotating crank (7) is carried by the counter-shaft and at its outer end is secured to a horizontally-extending link (8), the free end of which is fastened to a cross-head (9) sliding in ways (10), which are connected to cross-pieces (10ᵃ) supported by the legs (14), of the machine and in turn serve to stiffen and strengthen the machine. A saw bar (23) is connected at one end with either of studs (18) or (19) on cross-head (9), the opposite end of the saw bar (23) being connected with a saw (21).

By mounting the motor vertically I provide less vibration than would be caused to the machine if driven by a horizontal engine, the vertical motion of the engine serving to counter-act the horizontal motion of the saw.

By providing a friction gearing the motor can be driven at high speed, at which all motors operate best, in that it produces power proportionate to its speed, such speed being reduced in the gearing so as not to reciprocate the saw too swiftly. Furthermore, in case the saw buckles or works hard the friction gearing will slip to prevent breaking of the saw or machine. Toothed gears would cause a breakage of the saw and its connected parts.

It will be observed that by the above arrangement of parts I have converted the vertical reciprocating movement of the piston in the motor into the horizontal oscillatory movement of the connecting link, which movement in turn is converted into the horizontal reciprocatory movement of the cross head and saw.

In order to control the speed of reciprocation of the cross head and saw, as well as the starting and stopping of the saw, the friction pinion (4) is feathered on the drive-shaft (2), a lever (12) pivoted to a bracket (13) engaging the pinion to cause the latter to bind more or less snugly against the beveled edge of the friction disk (5).

The frame is supported by the legs (14) spread apart as shown to resist vibration and steady the machine. The legs are equipped with handles (15) to permit the machine to be carried from place to place. The front legs of the machine may also be provided with pins (16) adapted to be received in the recessed lugs (17ᵃ) of a beam (17). The outer end of the beam is provided with a tooth (17ᵇ) adapted to take into a log to hold the log steady while the machine is in operation. As the ground is often rough and the place where the machine must stand is often on a different level from the ground at the base of the tree or stump, I provide the legs (14) (14) with extensions (14ᵃ) (14ᵃ) to avoid the disadvantages resulting from positioning the machine on a different level from the cut which is to be made. The extensions (14ᵃ) are slidingly mounted on the legs and are held in place by any suitable fastening, such as (14ᵇ). By the use of these extension legs (14ᵃ) (14ᵃ), the machine may be raised to the level of the cut. The extension legs also permit the machine to be lifted more on one side than the other or inclined from front to rear or vice versa to adapt the saw to cut at small angles between the horizontal and vertical planes.

Heretofore it has been customary to shift the entire machine from a position where it will cut fallen timber to a position where it will cut standing timber. In my invention, it is merely necessary to change the saw on the studs (18) (19), the machine remaining in its normal position. To this end, I provide the cross-head (9) with a vertically- and a horizontally-projecting stud (18) and (19) respectively, the studs being each provided with a circumferential groove (20). The heel of the saw (21) is secured in a socketed yoke (22) mounted on one end of the saw bar (23), the opposite end of the bar (23) carrying a locking head (25). The locking head consists of a split sleeve adapted to fit over either one of the studs (18) or (19). A semi-circumferential slot (26) is formed through the sleeve. A latch (27) is pivoted at one end to the sleeve, the latch carrying a key (28) passing through the slot (26) and receivable in the groove (20), in the studs. In order to hold the latch in closed position I may provide a snap-spring (29) adapted to engage the curved free end of the latch. In this manner the saw is substantially journaled on either of the studs (18) or (19).

When felling standing timber or stumps, the saw is connected to stud (18) by means of the locking head described.

The saw bar may be of any suitable length and I may provide each machine with bars of different lengths. When a long bar is employed the machine is stationed some distance from the tree and proportionately out of danger when the tree falls. The longer rod operates in a radius of a large circle and is more effective in sawing felled timber of large diameter into logs, if desired.

In felling standing timber or stumps it becomes necessary to support the saw to prevent flexing, to which end I provide a stiffening bar (30) equipped intermediate its ends with wings (31), between which is received the back of the saw. The opposite ends of the stiffening bar are provided with clasping fingers (32) (32), taking over the back of the saw at or near the opposite ends thereof. The stiffening bar prevents the flexible saw from bending when first started into the standing timber and when the saw has entered the tree far enough for the tree to touch this stiffening bar (30) of the wings (31), the tree will push the bar off onto the ground and it will not be necessary to stop the machinery for its removal. The stiffening bar is not needed after the saw has entered the tree, thus far as the tree itself supports the saw thereafter.

In sawing the fallen trees into logs, or logs into bolts, I drive a formed piece of metal, such as shown in Fig. 9 over the saw into the log or bolt, the saw being within the tines of said form and guided by said form. This form is not necessary but may prove useful under some conditions, and insures the cut being made at a proper angle to the log.

In order to support the saw when cutting horizontally I preferably drive a rest (33) into the tree as shown in Fig. 1, the saw being supported by the rest. It is desirable to support the saw bar as well, to which end I provide hollow standards (34) (34) adapted to receive the pins (35) (35), in which is journaled the rolls (36). The pins are adjustable relative to the standards so as to support the saw bar (23) in horizontal position.

As one means for automatically feeding the saw against the timber when felling standing trees or stumps I provide a stake (37) capable of being driven into the ground. The stake is equipped with a plurality of rings (38), any one of which is adapted to be releasably engaged by one end of a tension spring (39). The opposite end of the spring carries a bail (40), in which is journaled a roll (41) or other anti-friction device. The saw bar (23) is received between the roll and the bail and the tension of spring (39) operates to cause the engagement of the saw teeth with the timber at all times.

The free end of the saw may have a handle (42) secured thereto to enable the operator to quickly swing the saw and saw bar on the stud (18) as a pivot away from the tree when spring (39) is disengaged from its stake, to prevent injury to the saw when the tree falls.

The machine will do the work of several crews of men and materially lessen the expense of felling trees and sawing them into logs, or cutting off stumps. The upkeep of the machine is small, nor is it liable to get out of order. It is strong and durable yet simple in construction and easily transported owing to its light weight. The rolls (36) and (41) reduce the friction to a minimum and the feeding device obviates the employment of a special man for this purpose. The saving in timber heretofore lost in stumpage is enormous. Substitution of one part for another or repairs can be easily and quickly made on the ground.

In practice the saw bar (23) may be from six to twelve feet long and the saw itself from six to nine feet long. In felling standing timber, the saw is supported (aside from the roll 36) at two points, namely, by the locking head (25) connecting the saw bar to the cross-head and at the point of engagement of the saw and tree. The length of the reciprocating saw and saw bar is such that the saw can be slightly inclined either downwardly or upwardly without impairing the effectiveness of its operation to cut a tree down close to the ground or say two feet or more above the ground level. Another advantage is that the crank (7) is rotated in a horizontal direction by the friction gears to give the saw a comparatively slow movement at the opposite ends of its stroke, which movement increases in speed as the saw nears the intermediate portion of its stroke. A jerky movement is imparted to a saw by a gear rotating in a vertical plane or to a saw driven by direct piston drive. The liability of the saw buckling or breaking is reduced to a minimum, as the saw does not attain full speed until after it has completed a portion of its cut. A direct drive starts the saw at high speed.

It is evident that changes might be made in the form and arrangement of the several parts described without departing from the spirit and scope of my invention.

Having thus fully disclosed my invention, what I claim as new is—

1. The combination in a sawing machine, of a portable frame, a motor mounted on the frame, guides on the frame, a cross head on the guides, friction gearing driven by the motor, means controlling the engagement of the friction gearing, transmission means connecting the gearing and the cross head, a saw, a saw bar interposed between and connecting the saw and the cross head, the saw bar being pivotally connected to the cross head, and means for retaining the saw in operative contact with the work.

2. The combination in a sawing machine, of a frame, guides on the frame, a cross head slidable on the guides, studs carried by the cross head and projecting at substantially right angles to each other, a saw, a saw bar, one end of which is connected to the saw, a locking head connected with the opposite end of the saw bar and pivotally receivable on either of the studs, means for holding the saw in operative contact with the work, and means for actuating the cross head.

3. A portable sawing machine, comprising a frame, a motor mounted thereon, a cross head slidable on the frame, transmission means connecting the motor and cross head, such means including friction gearing, studs carried by the cross head and projecting at approximately right angles to each other, the studs each being recessed, a saw, a slotted locking head connected with the saw and receivable on either of the studs, a latch pivoted to the locking head and a key carried by the latch and receivable through the slot of the latch in the recess in the stud.

4. A portable sawing machine comprising a frame, a motor mounted thereon, a slidable cross head on the frame, means connecting the motor and cross head for actuating the latter, studs carried by the cross head and projecting at an angle to each other, the studs each being recessed, a saw, a slotted locking head connected with the saw and receivable on either stud, a latch pivoted to the locking head, a key carried by the latch and receivable in the recess in the stud and means for releasably retaining the latch in closed position.

5. The combination with a reciprocating cross-head and means for actuating the cross-head, of a stud carried by the head, the stud being circumferentially grooved, a saw, a saw bar to which the saw is connected, a locking head carried by the saw bar, the locking head consisting of a sleeve receivable upon the stud, a semi-circumferential groove in the sleeve, a latch pivoted to the sleeve, and a key carried by the latch, the key passing through the slot and receivable in the groove in the stud.

6. In a portable sawing machine, the combination with a cross head capable of reciprocating movement only, of studs carried by the cross head and projecting at substantially right angles to each other, a saw, a socketed yoke secured to the saw, a locking head pivotally receivable upon either of the studs, a removable saw bar connecting the yoke and head, and means for holding the saw in operative engagement with the work.

7. The combination in a portable sawing machine, with a reciprocating cross head, and a saw, of a saw bar removably interposed between the saw and cross head and in alinement with the saw, one end of the saw bar being connected with the heel of the saw, means for pivotally securing the opposite end of the saw bar to the cross head, the saw bar operating to separate the cross head and saw, and means for holding the saw in operative engagement with the work.

8. A portable sawing machine for felling standing timber or stumps, comprising a reciprocating cross-head, means for actuating the same, a saw connected with the cross-head, and adapted to cut horizontally, and means applied to the saw for preventing flexure thereof, said means consisting of a stiffening bar extending substantially parallel with the saw, clasping fingers near the ends of the bar adapted to receive the back of the saw near its opposite ends and wings adapted to embrace and support the saw, intermediate its ends.

In testimony whereof, I affix my signature in presence of two witnesses.

PHILIP R. KRAMER.

Witnesses:
  MELVIN BERRY,
  SARAH L. JENKINS.